(12) United States Patent
Okada et al.

(10) Patent No.: US 9,257,853 B2
(45) Date of Patent: Feb. 9, 2016

(54) BATTERY PACK

(75) Inventors: Masaaki Okada, Mie (JP); Masaki Ikeda, Mie (JP); Norihiro Iwamura, Mie (JP); Motoharu Muto, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 190 days.

(21) Appl. No.: 13/885,742

(22) PCT Filed: Oct. 5, 2011

(86) PCT No.: PCT/JP2011/072968
§ 371 (c)(1),
(2), (4) Date: May 16, 2013

(87) PCT Pub. No.: WO2012/081296
PCT Pub. Date: Jun. 21, 2012

(65) Prior Publication Data
US 2013/0229151 A1    Sep. 5, 2013

(30) Foreign Application Priority Data

Dec. 13, 2010  (JP) ................................ 2010-276790

(51) Int. Cl.
*H02J 7/00* (2006.01)
*H01M 10/44* (2006.01)
(Continued)

(52) U.S. Cl.
CPC ......... *H02J 7/0029* (2013.01); *H01M 10/4257* (2013.01); *H01M 10/44* (2013.01); *H01M 10/48* (2013.01); *H01M 2010/4271* (2013.01); *H01M 2010/4278* (2013.01)

(58) Field of Classification Search
CPC . H01M 10/44; H01M 10/48; H01M 10/4257; H02J 7/0029

USPC .......................................................... 320/112
See application file for complete search history.

(56) References Cited

U.S. PATENT DOCUMENTS 6,208,117 B1 * 3/2001 Hibi .............................. 320/134
2009/0134840 A1   5/2009 Yamamoto et al.

FOREIGN PATENT DOCUMENTS

EP      2065999 A1    6/2009
JP      06-076965 A   3/1994
(Continued)

OTHER PUBLICATIONS

International Search Report for corresponding International Application No. PCT/JP2011/072968 mailed Jan. 17, 2012.
(Continued)

*Primary Examiner* — Arun Williams
(74) *Attorney, Agent, or Firm* — Renner, Otto, Boisselle & Sklar, LLP

(57) ABSTRACT

The battery pack includes: a charging terminal receiving power from a charger while connected to the charger; a battery connected to the charging terminal and recharged by power from the charger via the charging terminal; a protective circuit performing a protective operation of detecting an overcharge of the battery by using power from the battery while receiving a driving signal, and terminating the protective operation when receiving no driving signal; an activation terminal receiving an activation signal from the charger while connected to the charger; an activation circuit connected to the activation terminal and configured to output the driving signal to the protective circuit while receiving the activation signal from the charger via the activation terminal; and an auxiliary activation circuit connected to the charging terminal and configured to provide the driving signal to the protective circuit while the battery receives power from the charger via the charging terminal.

3 Claims, 2 Drawing Sheets

(51) Int. Cl.
*H01M 10/48* (2006.01)
*H01M 10/42* (2006.01)

(56) References Cited

FOREIGN PATENT DOCUMENTS

| | | |
|---|---|---|
| JP | 09-149628 A | 6/1997 |
| JP | 2002-320334 A | 10/2002 |
| JP | 2004-222438 A | 8/2004 |
| JP | 2005-012958 A | 1/2005 |
| JP | 2007-141572 A | 6/2007 |
| JP | 2007-295713 A | 11/2007 |
| JP | 2008-148369 A | 6/2008 |
| JP | 2008148369 A * | 6/2008 |
| JP | 2008-199827 A | 8/2008 |
| JP | 2008-271690 A | 11/2008 |

OTHER PUBLICATIONS

Form PCT/ISA/237 for corresponding International Application No. PCT/JP2011/072968 dated Jan. 17, 2012.
European Search Report for corresponding European Application No. 11848852.7, dated Dec. 3, 2013.

* cited by examiner

BATTERY PACK

TECHNICAL FIELD

The present invention relates to battery packs and particularly to a battery pack incorporating therein a secondary battery together with a charge and discharge control circuit.

BACKGROUND ART

Recently as a battery pack used for a rechargeable load device having relatively high power consumption such as an electrical power tool, a battery pack using lithium-ion batteries has attracted attention because it has high energy density and is lightweight. However, such a lithium-ion battery is easily damaged by overcharge or over discharge. Hence, generally, in view of improvement of reliability and safety, a protective circuit for monitoring each cell voltage is provided in the battery pack, and charge-discharge control is performed based on the cell voltage.

Generally, the aforementioned protective circuit is constituted by an IC designed for this use. When the protective circuit is in operation even when the battery pack is not connected to the charger or even when a load device powered by the battery pack as its power source is turned off, a remaining amount of the battery may be reduced due to a current consumed by the protective circuit.

In view of the above, for example, document 1 (JP 2008-199827 A) discloses a battery pack which switches the protective circuit to a rest state or a standby state with a low consumption current when the battery pack is not connected to the charger or when the load device connected to the battery packs is turned off. Further, this battery pack switches the protective circuit to an operating state in response to an activation signal inputted from the charger or the load device when the battery pack is connected to the charger or when the load device is turned on.

Normally, the activation signal is sent from the charger. However, when the breakage of the charger or the contact failure of a connector for transferring the activation signal occurs, the activation signal is not inputted into the battery pack. In this situation, the charging process is started while the protective circuit does not perform the protective operation. Thus, the battery pack is likely to be in an overcharged state.

SUMMARY OF INVENTION

In view of the above insufficiency, the present invention has aimed to propose a battery pack capable of activating a protective circuit in a charging process even when receiving no activation signal from an external device.

The first aspect of the battery pack in accordance with the present invention includes a charging terminal, a battery, a protective circuit, an activation terminal, an activation circuit, and an auxiliary activation circuit. The charging terminal is configured to receive power from the charger while connected to the charger. The battery is connected to the charging terminal and is configured to be recharged by power supplied from the charger via the charging terminal. The protective circuit is configured to perform a protective operation of detecting an overcharge of the battery by use of power supplied from the battery. The activation terminal is configured to receive an activation signal from the charger while connected to the charger. The activation circuit is connected to the activation terminal. The auxiliary activation circuit is connected to the charging terminal. The activation circuit is configured to output a driving signal to the protective circuit while receiving the activation signal from the charger via the activation terminal. The protective circuit is configured to perform the protective operation while receiving the driving signal, and to terminate the protective operation when receiving no driving signal. The auxiliary activation circuit is configured to judge whether or not the battery receives power from the charger via the charging terminal, and is configured to provide the driving signal to the protective circuit while the battery receives power from the charger via the charging terminal.

As for the second aspect of the battery pack in accordance with the present invention, in addition to the first aspect, the auxiliary activation circuit is configured to, upon acknowledging that a voltage of the charging terminal is not less than a predetermined threshold, determine that the battery receives power from the charger via the charging terminal.

As for the third aspect of the battery pack in accordance with the present invention, in addition to the second aspect, the predetermined threshold is identical to a voltage of the battery when fully charged.

As for the fourth aspect of the battery pack in accordance with the present invention, in addition to the second or third aspect, the activation circuit includes an input terminal connected to the activation terminal, and is configured to output the driving signal while a voltage applied to the input terminal is not less than the predetermined voltage. The auxiliary activation circuit is a series circuit of a zener diode and a resistor. The zener diode has a cathode connected to the charging terminal and an anode connected to the input terminal of the activation circuit via the resistor. The series circuit has a voltage drop which is determined by a breakdown voltage of the zener diode and a resistance of the resistor and is selected such that the voltage of the input terminal is not less than the predetermined voltage while the voltage of the charging terminal is not less than the predetermined threshold.

As for the fifth aspect of the battery pack in accordance with the present invention, in addition to any one of the first to fourth aspects, the battery pack further includes: a protective element interposed between the battery and the charging terminal; and a breaker circuit. The protective circuit is configured to output an overcharge detection signal to the breaker circuit in response to detection of the overcharge of the battery. The breaker circuit is configured to control the protective element in such a manner to separate the battery from the charging terminal in response to reception of the overcharge detection signal.

DESCRIPTION OF EMBODIMENTS

Figure 1:
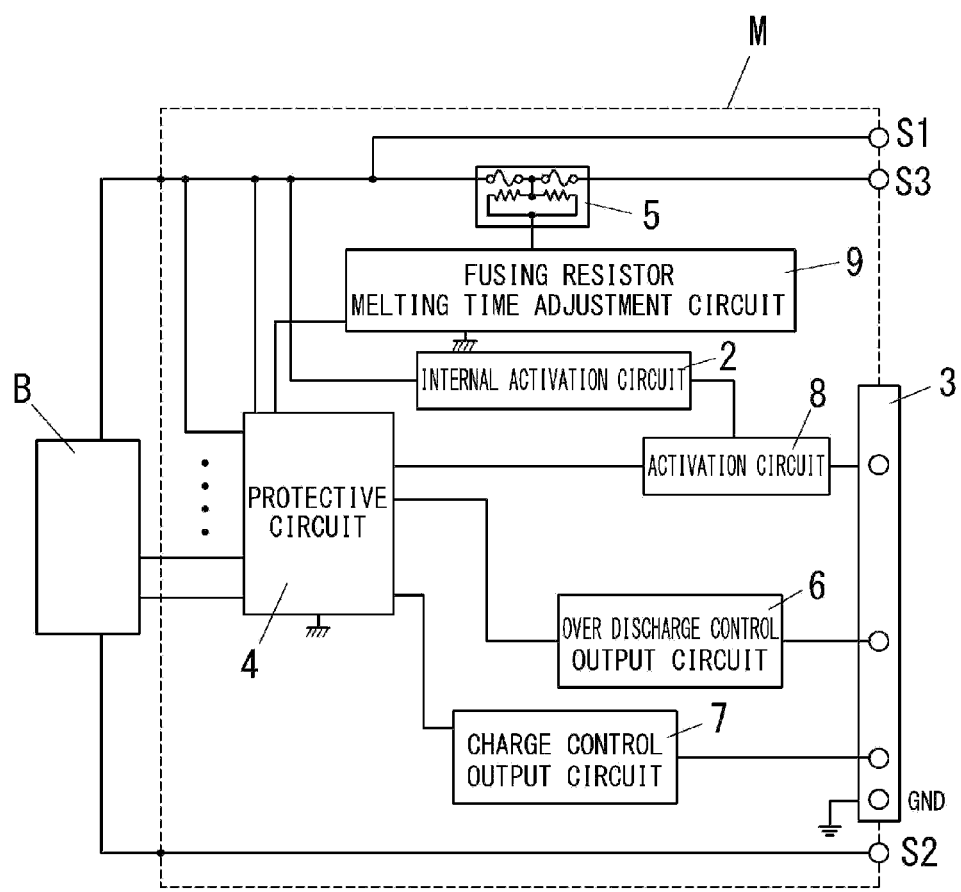
FIG. 1 is a block diagram illustrating a battery pack of one embodiment in accordance with the present invention.

The following explanation referring to the figures is made to an instance of an embodiment of the present invention. A battery pack shown in the figures includes a group of battery cells B constituted by plural (five, in the instance shown in FIG. 2) lithium-ion secondary batteries connected in series with each other. The group of the battery cells B has a positive electrode which is connected to a power terminal S1 and is connected to a charging terminal S3 through a fusing resistor 5. In addition, the group of the battery cells has a negative electrode which is connected to a power terminal S2 to be connected to a ground. The fusing resistor 5 is a nonrenewable element in which an electrical circuit is interrupted when a fuse is broken by supplying a current to a heater resistor.

In this battery pack, a protective circuit 4, an over discharge control output circuit 6, a charge control output circuit 7, an activation circuit 8, and a fusing resistor melting time adjustment circuit 9 are provided. The protective circuit 4 operates with the group of the battery cells as its power source. In the present embodiment, the protective circuit 4 includes a voltage detection circuit configured to measure a voltage of each battery cell B, a charge and discharge control circuit, and an overcharge detection circuit. The protective circuit 4 is connected to a signal terminal unit 3 via the over discharge control output circuit 6, the charge control output circuit 7, and the activation circuit 8. When the battery pack is connected to a charger or a load device, the signal terminal unit 3 is connected to a control circuit of the charger or a control circuit of the load device, and allows signals to be inputted from or outputted to the charger or the load device.

Normally, the protective circuit 4 is in a rest state or a standby state having a low consumption current. When the battery pack is connected to the charger, the activation circuit 8 supplies an output in response to reception of the activation signal outputted from the charger, and this output switches the protective circuit 4 to a state of operating with the battery cell as its power source. In contrast, when the battery pack is connected to the load device, the activation circuit 8 receives the activation signal which is outputted from the load device when activated, and the protective circuit 4 is switched to the operating state by the output from the activation circuit 8. In the charging process, the protective circuit 4 measures the voltage of the battery cell and supplies an output for charging control to the charger via the charge control output circuit 7. According to this output, the charger switches the constant current charging to the constant voltage charging or terminates the charging.

Further, when a voltage of the battery cell exceeds a predetermined voltage in a charging process, the protective circuit 4 controls the fusing resistor melting time adjustment circuit 9 to interrupt a charging path by breaking fuses of the fusing resistor 5.

In a discharging process in which the load device is connected, the protective circuit 4 measures the voltage of the battery cell B. When the voltage of the battery cell B falls below a predetermined value, the protective circuit 4 controls the over discharge control output circuit 6 in such a manner to notify the load device of an event where the voltage of the battery cell B falls below the predetermined value. Thus, the control circuit of the load device performs a shutdown operation.

Figure 2:
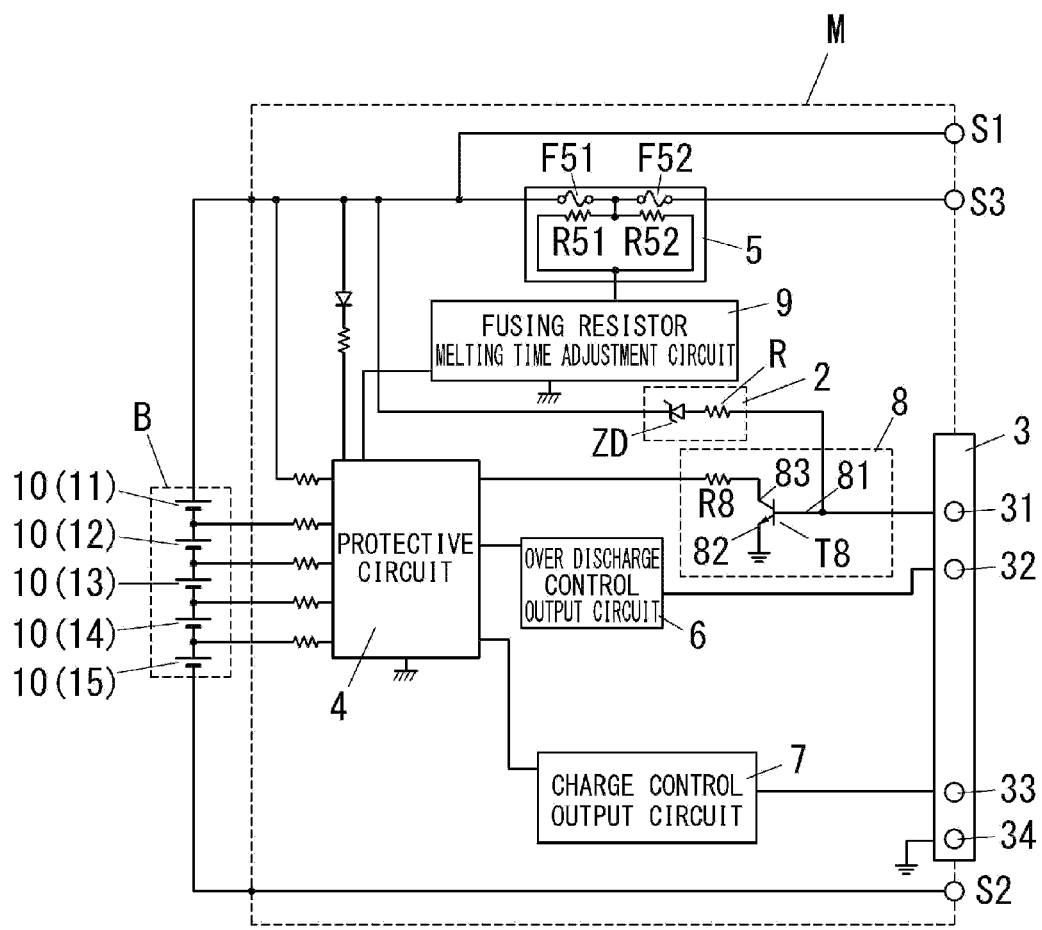
FIG. 2 is a diagram illustrating the circuit of the above battery pack.

Note that, the protective circuit 4, the over discharge control output circuit 6, the charge control output circuit 7 and the activation circuit 8 have the same configuration as those of the prior instance, and therefore concrete circuits and detailed explanations thereof are deemed unnecessary. Each of FIG. 1 and FIG. 2 shows a circuit module M in the battery pack.

When the battery pack is connected to the charger, the battery pack is likely to fail to receive the activation signal due to breakage of the charger and/or contact failure of the signal terminal unit 3. In this case, the charging process would be started and the charging current would be supplied via the charging terminal S3 while the protective circuit 4 is not activated. However, an internal activation circuit 2 generates an internal activation signal to activate the protective circuit 4 through the activation circuit 8.

The internal activation circuit 2 is configured to turn on a transistor of the activation circuit 8 when a voltage of the charging terminal S3 (the voltage of the group of the battery cells B) is not less than a predetermined value. For example, as shown in FIG. 2, the internal activation circuit 2 is constituted by a series circuit of a zener diode ZD and a resistor R and is interposed between the charging terminal S3 (a high potential side of the group of the battery cells B) and a side of the activation circuit 8 connected to the signal terminal unit 3.

For example, it is assumed that the charging is started while the protective circuit 4 is not activated. In this case, when the total voltage of the group of the battery cells B is not less than a predetermined voltage (when the five batteries having the rated resistance of 3.6 V cells are connected in series with each other, the predetermined voltage is defined as the total voltage of 4.2 V*5=21 V), the internal activation circuit 2 turns on the transistor of the activation circuit 8. Thus, the protective circuit 4 is switched to the operating state, and the charging is continued under the charging control conducted by the protective circuit 4. When breakage of the charger or contact failure of the signal terminal unit 3 occurs, the charging control based on the signal from the protective circuit 4 is likely to be not performed. In this case, when the voltage of the battery cell is further increased, the interruption is made by melting the fuse of the aforementioned fusing resistor 5.

Next, the battery pack of one embodiment in accordance with the present invention is explained in detail. The battery pack of the present embodiment is defined as a battery pack rechargeable by a charger (not shown), and includes the battery B and the circuit module M.

As shown in FIG. 2, the battery B is an assembled battery including five secondary batteries (battery cells) 10 (11, 12, 13, 14, and 15) connected in series with each other. The voltage of the battery B is equal to the sum of the voltages of the five secondary batteries 10. In the present embodiment, the positive electrode of the battery B is defined by a positive electrode of the secondary battery 11, and the negative electrode of the battery B is defined by a negative electrode of the secondary battery 15.

For example, each of the secondary batteries 10 is a lithium-ion battery. In the present embodiment, the secondary battery 10 is a lithium-ion battery which has a nominal voltage (rated voltage) of 3.6 V and has a maximum voltage (full charge voltage) of 4.2 V. Hence, the nominal voltage (voltage across terminals) of the battery B is 18 V. Further, the voltage of the battery B when fully charged is 21 V.

Note that, the secondary battery 10 is not limited to a lithium-ion battery but may be selected from a nickel-cadmium battery and a nickel-metal-hydride battery. Further, the number of secondary batteries 10 is not limited five. Alternatively, the secondary batteries 10 may be connected in parallel with each other or may be connected in series parallel with each other.

As shown in FIG. 2, the circuit module M includes the power terminal (positive terminal) S1 electrically connected to the positive electrode of the battery B (the positive electrode of the secondary battery 11), and the power terminal (negative terminal) S2 electrically connected to the negative electrode of the battery B (the negative electrode of the secondary battery 15). When the battery pack is connected to the load device, the power terminals S1 and S2 are connected to corresponding terminals of the load device, respectively. Thus, power is supplied from the battery B of the battery pack to the load device.

The circuit module M further includes the charging terminal S3 connected to the battery B (the positive terminal of the battery B). When the battery pack is connected to the charger, the charging terminal S3 is connected to a power supply terminal of the charger. The power supply terminal is defined as a terminal used by the charger to supply power for charging the battery B to the battery pack. In other words, the charging terminal S3 is configured to receive power from the charger while connected to the charger. The charging terminal S3 is electrically connected to the positive electrode of the battery B. Therefore, the battery B is configured to be recharged (charged) by power supplied from the charger via the charging terminal S3.

The circuit module M further includes the auxiliary activation circuit (internal activation circuit) 2, the signal terminal unit 3, the protective circuit 4, the protective element (fusing resistor) 5, the over discharge control output circuit 6, the charge control output circuit 7, the activation circuit (main activation circuit) 8, and the breaker circuit (fusing resistor melting time adjustment circuit) 9.

The signal terminal unit 3 includes an activation terminal 31, an over discharge detection terminal 32, a charge control terminal 33, and a ground terminal 34. When the battery pack is connected to the charger, the activation terminal 31, the charge control terminal 33, and the ground terminal 34 are connected to corresponding terminals of the charger, respectively. Further, when the battery pack is connected to the load device, the activation terminal 31, the over discharge detection terminal 32, and the ground terminal 34 are connected to corresponding terminals of the load device, respectively. The activation terminal 31 is configured to receive the activation signal from the charger while connected to the charger. For example, the activation signal is defined as a voltage signal having a predetermined voltage. Note that, the activation terminal 31 is also configured to receive the activation signal from the load device while connected to the load device.

The protective circuit 4 is configured to perform a protective operation of detecting an overcharge of the battery B by use of power supplied from the battery B.

In the present embodiment, the protective circuit 4 is configured to measure voltages of the respective secondary batteries 10 of the battery B. The protective circuit 4 is configured to, in the protective operation, compare the measured voltage of the secondary battery 10 with a first threshold. The first threshold is defined as a threshold used for judging whether or not the secondary battery 10 is in an overcharged state. In the present embodiment, the first threshold is 4.35 V. The protective circuit 4 is configured to, upon acknowledging that at least one of the measured voltages of the respective secondary batteries 10 (11, 12, 13, 14, and 15) is not less than the first threshold, output an overcharge detection signal to the breaker circuit (fusing resistor melting time adjustment circuit) 9.

Additionally, the protective circuit 4 is configured to, in the protective operation, compare the measured voltage of the secondary battery 10 with a second threshold and a third threshold.

The second threshold is defined as a threshold used for judging whether or not the secondary battery 10 is in a fully charged state. The second threshold is equal to the voltage (in the present embodiment, 4.2 V) of the secondary battery 10 when the secondary battery 10 is fully charged. This second threshold is less than the first threshold.

The protective circuit 4 is configured to, upon acknowledging that at least one of the measured voltages of the respective secondary batteries 10 (11, 12, 13, 14, and 15) is not less than the second threshold, output a charge control signal to the charge control output circuit 7.

The third threshold is defined as a threshold used for judging whether or not the secondary battery 10 is in an over discharged state. In the present embodiment, the third threshold is 2.0 V. This third threshold is less than the second threshold.

The protective circuit 4 is configured to, upon acknowledging that at least one of the measured voltages of the respective secondary batteries 10 (11, 12, 13, 14, and 15) is not greater than the third threshold, output an over discharge detection signal to the over discharge control output circuit 6.

In the present embodiment, the protective circuit 4 is configured to perform the protective operation while receiving a driving signal, and to terminate the protective operation when receiving no driving signal. A state of the protective circuit 4 in which the protective circuit 4 performs the protective operation is referred to as the operating state. A state of the protective circuit 4 in which the protective circuit 4 performs no protective operation is referred to as the rest state or the standby state.

The over discharge control output circuit 6 is configured to output a voltage signal to the over discharge detection terminal 32 in response to reception of the over discharge detection signal from the protective circuit 4. For example, when receiving the voltage signal via the over discharge detection terminal 32, the load device connected to the battery pack determines that shortage of power of the battery occurs, and terminate the operation of the load.

The charge control output circuit 7 is configured to output a voltage signal to the charge control terminal 33 in response to reception of the charge control signal from the protective circuit 4. For example, the charger is configured to selectively perform a constant current charging process of charging the battery B by means of supplying a constant current to the battery B via the charging terminal S3 and a constant voltage charging process of charging the battery B by means of applying a constant voltage to the battery B via the charging terminal S3. The charger performs the constant current charging process unless the charger receives the voltage signal via the charge control terminal 33, and performs the constant voltage charging process when the charger receives the voltage signal via the charge control terminal 33.

The protective element 5 is interposed between the battery B and the charging terminal S3. The protective element 5 includes a series circuit of two fuses F51 and F52 interposed between the battery B and the charging terminal S3. Additionally, the protective element 5 includes a resistor (heater resistor) R51 positioned adjacent to the fuse F51 and a resistor (heater resistor) R52 positioned adjacent to the fuse F52. When a current flows through the heater resistors R51 and R52, the heater resistors R51 and R52 produce heat, thereby melting the respective corresponding fuses F51 and F52. Note that, the protective element 5 may include resettable fuses as an alternative to the fuses F51 and F52.

The fusing resistor melting time adjustment circuit 9 is configured to control the protective element 5 in such a manner to separate the battery B from the charging terminal S3 in response to reception of the overcharge detection signal from the protective circuit 4. In the present embodiment, the fusing resistor melting time adjustment circuit 9 is configured to, in response to reception of the overcharge detection signal from the protective circuit 4, supply a current to the resistors R51 and R52 of the protective element 5 to allow the resistor R51 and R52 to produce heat so as to separate the battery B from the charging terminal S3.

The activation circuit 8 is connected to the activation terminal 31. The activation circuit 8 is configured to output the driving signal to the protective circuit 4 while receiving the activation signal from the charger (or the load device) via the activation terminal 31. In the present embodiment, the activation circuit 8 includes an input terminal 81 connected to the activation terminal 31. The activation circuit 8 is configured to output the driving signal to the protective circuit 4 while a voltage applied to the input terminal 81 is not less than the predetermined voltage (i.e., the voltage of the activation signal). For example, the activation circuit 8 includes an NPN transistor T8 and a resistor R8. The NPN transistor T8 has the base (input terminal) 81 connected to the activation terminal 31, an emitter 82 grounded, and a collector 83 connected to the protective circuit 4 via the resistor R8. In the present embodiment, while the activation signal is provided to the activation terminal 31, the NPN transistor T8 is turned on and then the driving signal is provided from the activation circuit 8 to the protective circuit 4.

The auxiliary activation circuit 2 is connected to the charging terminal S3. The auxiliary activation circuit 2 is configured to judge whether or not the battery B receives power from the charger via the charging terminal S3. The auxiliary activation circuit 2 is configured to provide the driving signal to the protective circuit 4 while the battery B receives power from the charger via the charging terminal S3.

In the present embodiment, the auxiliary activation circuit 2 is configured to, upon acknowledging that a voltage of the charging terminal S3 is not less than a predetermined threshold, determine that the battery B receives power from the charger via the charging terminal S3. In this regard, the predetermined threshold is identical to a voltage of the battery B when the battery B is fully charged. In the present embodiment, the predetermined threshold is 21 V. Note that, the voltage of the battery B when fully charged depends on a type of the secondary battery 10. For example, the voltage of the secondary battery 10 when it is fully charged is 4.1 V, the voltage of the battery B fully charged is 20.5 V (=4.1 V*5). In this case, the predetermined threshold is selected to be 20.5 V.

Note that, the predetermined threshold is not limited to the voltage of the battery B when fully charged. For example, the predetermined threshold is determined in consideration of the timing of activating the protective circuit 4 by the auxiliary activation circuit 2.

As shown in FIG. 2, the auxiliary activation circuit 2 is the series circuit of the zener diode ZD and the resistor R. The zener diode ZD has a cathode connected to the charging terminal S3 and an anode connected to the input terminal 81 of the activation circuit 8 via the resistor R. Note that, in FIG. 2, the zener diode ZD is connected to the charging terminal S3 through the protective element 5.

This series circuit (i.e., the auxiliary activation circuit 2) has a voltage drop which is determined by a breakdown voltage of the zener diode ZD and a resistance of the resistor R. The voltage drop caused by this series circuit selected such that the voltage of the input terminal 81 is not less than the predetermined voltage (the voltage of the activation signal) while the voltage of the charging terminal S3 is not less than the predetermined threshold (21 V, in the present embodiment). In the present embodiment, the auxiliary activation circuit 2 is configured to apply a voltage identical to the voltage of the activation signal to the input terminal 81 of the activation circuit 8.

Accordingly, when the voltage of the charging terminal S3 (i.e., the voltage of the positive electrode of the battery B) reaches 21 V, the auxiliary activation circuit 2 applies a voltage identical to the voltage of the activation signal to the input terminal 81 of the activation circuit 8. Consequently, the NPN transistor T8 of the activation circuit 8 is turned on, and then the driving signal is outputted from the activation circuit 8 to the protective circuit 4. In other words, the auxiliary activation circuit 2 is configured to control the activation circuit 8 in such a manner to provide the driving signal to the protective circuit 4. Alternatively, the auxiliary activation circuit 2 itself may output the driving signal to the protective circuit 4.

Besides, in the present embodiment, the auxiliary activation circuit 2 judges, based on the voltage of the charging terminal S3, whether or not the battery B receives power from the charger via the charging terminal S3. Alternatively, the auxiliary activation circuit 2 may judge, based on a current flowing between the charging terminal S3 and the battery B, whether or not the battery B receives power from the charger via the charging terminal S3. Generally, a current supplied from the charger to the battery B is decreased as a charged level of the battery B approaches to a fully charged level. Accordingly, when the current flowing between the charging terminal S3 and the battery B is not greater than a predetermined threshold, the auxiliary activation circuit 2 may determine that the battery B receives power from the charger via the charging terminal S3.

As mentioned above, the battery pack of the present embodiment is a battery pack which includes: the group of the battery cells B constituted by plural secondary battery cells; the charging terminal S3 connected to the charger designed to charge the group of the battery cells B; the signal terminal unit 3 configured to send a signal to and receive a signal from the charger; the protective circuit 4 configured to individually monitor the voltages of the respective battery cells and perform the charging control according to the monitoring result; and the activation circuit 8 configured to switch the protective circuit 4 from the rest state or the standby state to the operating state in response to reception of the activation signal from the charger via the signal terminal unit 3. The battery pack of the present embodiment is characterized by the internal activation circuit 2 configured to send the internal activation signal to the activation circuit 8 in response to reception of power via the charging terminal S3 so as to switch the protective circuit 4 to the operating state.

In other words, the battery pack of the present embodiment is defined as a battery pack rechargeable by a charger. The battery pack of the present embodiment includes the charging terminal S3, the battery B, the protective circuit 4, the activation terminal 31, the activation circuit 8, and the auxiliary activation circuit 2. The charging terminal S3 is configured to receive power from the charger while connected to the charger. The battery B is connected to the charging terminal S3 and is configured to be recharged by power supplied from the charger via the charging terminal S3. The protective circuit 4 is configured to perform the protective operation of detecting an overcharge of the battery B by use of power supplied from the battery B. The activation terminal 31 is configured to receive the activation signal from the charger while connected to the charger. The activation circuit 8 is connected to the activation terminal 31. The auxiliary activation circuit 2 is connected to the charging terminal S3. The activation circuit 8 is configured to output the driving signal to the protective circuit 4 while receiving the activation signal from the charger via the activation terminal 31. The protective circuit 4 is configured to perform the protective operation while receiving the driving signal, and to terminate the protective operation when receiving no driving signal. The auxiliary activation circuit 2 is configured to judge whether or not the battery B receives power from the charger via the charging terminal S3, and is configured to provide the driving signal to the protective circuit 4 while the battery B receives power from the charger via the charging terminal S3.

Accordingly, even if no activation signal is inputted from the charger, the battery pack of the present embodiment switches the protective circuit 4 from the rest state or the standby state to the operating state by use of the internal activation signal from the internal activation circuit (auxiliary activation circuit) 2.

Further, in the battery pack of the present embodiment, the auxiliary activation circuit 2 is configured to, upon acknowledging that a voltage of the charging terminal S3 is not less than the predetermined threshold, determine that the battery B receives power from the charger via the charging terminal S3. In this regard, the predetermined threshold is identical to a voltage of the battery B when fully charged (in the present embodiment, 21 V).

In brief, it is preferable that the internal activation circuit 2 be configured to, when a voltage at a high potential side of the charging terminal S3 exceeds a predetermined threshold value, send the internal activation signal to the activation circuit 8. Further, it is preferable that a value of a voltage considered as the voltage of the battery cell in the over charged state be used as such a threshold value.

Furthermore, in the battery pack of the present embodiment, the activation circuit 8 includes the input terminal 81 connected to the activation terminal 31, and is configured to output the driving signal while a voltage applied to the input terminal 81 is not less than the predetermined voltage. The auxiliary activation circuit 2 is the series circuit of the zener diode ZD and the resistor R. The zener diode ZD has the cathode connected to the charging terminal S3 and the anode connected to the input terminal 81 of the activation circuit 8 via the resistor R. The series circuit has the voltage drop which is determined by the breakdown voltage of the zener diode ZD and the resistance of the resistor R and is selected such that the voltage of the input terminal 81 is not less than the predetermined voltage while the voltage of the charging terminal S3 is not less than the predetermined threshold.

In brief, it is preferable that the series circuit of the zener diode ZD and the resistor R connected between the charging terminal S3 and the side of the activation circuit 8 connected to the signal terminal unit be used as the internal activation circuit 2.

Moreover, the battery pack of the present embodiment includes the protective element 5 interposed between the battery B and the charging terminal S3, and the breaker circuit 9. The protective circuit 4 is configured to output the overcharge detection signal to the breaker circuit 9 in response to detection of the overcharge of the battery B. The breaker circuit 9 is configured to control the protective element 5 in such a manner to separate the battery B from the charging terminal S3 in response to reception of the overcharge detection signal.

As mentioned above, the battery pack of the present embodiment is capable of activating the protective circuit 4 in the charging process even when receiving no activation signal from an external device. Consequently, the deterioration of the secondary battery cell (secondary battery) 10 which would otherwise occur due to an overcharge thereof can be prevented and simultaneously the charging process can be performed safely.

Besides, the internal activation circuit 2 does not activate the activation circuit 8 unless the voltage of the charging terminal S3 reaches the aforementioned voltage (the voltage of the battery B when it is fully charged). The voltage derived from the battery cell is lower than the voltage of the charging terminal S3. Therefore, the internal activation circuit 2 does not activate the activation circuit 8 in a discharging state in which the battery pack is connected to the load device. Further, the voltage corresponding to the overcharge of the battery cell (secondary battery) 10 is used as the threshold. Hence, the internal activation circuit 2 does not initiate the operation of the protective circuit 4 unless the overcharge occurs. Thus, the power consumption can be suppressed. Additionally, the battery pack has a simplified configuration in which the internal activation circuit 2 constituted by the series circuit of the zener diode ZD and the resistor R is connected between the power terminal S1 and the side of the activation circuit 8 connected to the signal terminal unit 3. Consequently, an increase in the production cost of the battery pack due to provision of the internal activation circuit 2 is slight.

The invention claimed is:

1. A battery pack rechargeable by a charger, comprising:
a charging terminal configured to receive power from the charger while connected to the charger;
a battery connected to the charging terminal and configured to be recharged by power supplied from the charger via the charging terminal;
a protective circuit configured to perform a protective operation of detecting an overcharge of the battery by use of power supplied from the battery;
an activation terminal configured to receive an activation signal from the charger while connected to the charger;
an activation circuit connected to the activation terminal; and
an auxiliary activation circuit connected to the charging terminal,
wherein:
the activation circuit is configured to output a driving signal to the protective circuit while receiving the activation signal from the charger via the activation terminal;
the protective circuit is configured to perform the protective operation while receiving the driving signal, and to terminate the protective operation when receiving no driving signal;
the auxiliary activation circuit is configured to judge whether or not the battery receives power from the charger via the charging terminal, and is configured to provide the driving signal to the protective circuit while the battery receives power from the charger via the charging terminal;
the auxiliary activation circuit is configured to, upon acknowledging that a voltage of the charging terminal is not less than a predetermined threshold, determine that the battery receives power from the charger via the charging terminal;
the activation circuit includes an input terminal connected to the activation terminal, and is configured to output the driving signal while a voltage applied to the input terminal is not less than a predetermined voltage;
the auxiliary activation circuit is a series circuit of a zener diode and a resistor;
the zener diode has a cathode connected to the charging terminal and an anode connected to the input terminal of the activation circuit via the resistor; and
the series circuit has a voltage drop caused by the series circuit is determined by a breakdown voltage of the zener diode and a resistance of the resistor and is selected such that the voltage of the input terminal is not less than the predetermined voltage while the voltage of the charging terminal is not less than the predetermined threshold.

2. The battery pack as set forth in claim 1, wherein the predetermined threshold is identical to a voltage of the battery when fully charged.

3. The battery pack as set forth in claim 1, wherein
the battery pack further comprises:
   a protective element interposed between the battery and the charging terminal; and
   a breaker circuit,
the protective circuit is configured to output an overcharge detection signal to the breaker circuit in response to detection of the overcharge of the battery, and
the breaker circuit is configured to control the protective element in such a manner to separate the battery from the charging terminal in response to reception of the overcharge detection signal.

* * * * *